_United States Patent Office_

2,768,173
Patented Oct. 23, 1956

2,768,173
PREPARATION OF CHLORAL

Herbert C. Wohlers and Charles W. Lentz, St. Louis, Mich., assignors to Michigan Chemical Corporation, St. Louis, Mich., a corporation of Michigan No Drawing. Application February 6, 1952,
Serial No. 270,276

11 Claims. (Cl. 260—340)

This invention relates to the manufacture of chloral and it relates more particularly to a new and improved method for manufacturing chloral from paraldehyde (the tripolymer of acetaldehyde). It is an object of this invention to provide a new and improved method for producing chloral from paraldehyde and it is a related object to provide a method of the type described which in the manufacture of chloral makes use of less chlorine than processes which have heretofore been employed, which makes more efficient use of the chlorine employed in the various chlorination steps, which has a high paraldehyde efficiency, which produces a chloral capable of use in the manufacture of a high setting point DDT and which does not require the use of alcohols or like materials in the manufacture thereof.

Another object is to provide a new and economical method for producing chloral at high yield and it is a related object to provide a new and improved method for the separation and purification of chloral from materials with which it might be associated in reaction products.

A further object is to produce compounds such as tetrachloroparaldehyde, pentachloroparaldehyde and hexachloroparaldehyde and to provide a new and improved method for producing same from paraldehyde.

Briefly described, chloral is prepared in accordance with the practice of this invention by the reaction of paraldehyde under anhydrous conditions with sufficient chlorine to chlorinate beyond the trichloroparaldehyde and apparently produce a new and more staple tetra, penta, or hexachloroparaldehyde which can be depolymerized in aqueous media with chlorination preferably in combination therewith to produce the corresponding chloral hydrate. Chloral is separated and purified by treatment of the reaction product by washing first with aqueous sulphuric acid and then by washing with non-aqueous sulphuric acid. The chloral produced is suitable for the manufacture of DDT and the like.

Theoretically the amount of chlorine required to prepare chloral from paraldehyde in accordance with the practice of this invention is considerably less than that required in systems which have heretofore been employed in the preparation of chloral by chlorination of alcohol. In the systems which have heretofore been employed, about one-fourth of the chlorine is used for oxidation of the alcohol to aldehyde. This savings in chlorine is of particular importance in periods when shortages in chlorine develop or when the costs thereof rise. In addition, it will be apparent from the brief description of this invention that alcohol, which is a critical material in times of emergency and which has been used in the manufacture of chloral, does not constitute an essential ingredient in the manufacturing process. Thus considerable savings can be made in the cost of materials and the availability thereof does not constitute a production problem in manufacture in accordance with the present invention.

Paraldehyde has been chlorinated by others but under conditions which differ considerably from the technique described and claimed herein and in the production of entirely unrelated products.

In United States Patent No. 2,552,934, description is made of a process wherein acetaldehyde is chlorinated in a four-step reaction to produce chloral. In the first two steps, water and acetaldehyde in the ratio of 3.5 to 4.5 mols water to one mol acetaldehyde are fed in continuous fashion with chlorine for reaction at a temperature of 5–15° C. in the first step and 25–35° C. in the second step whereby the chlorine is absorbed in the ratio of about 1.9–2.1 mols per mol acetaldehyde to produce dichloroacetaldehyde. In the third and fourth steps, chlorine is continuously dispersed in the mixture for reaction at a temperature of 65–70° C. in the third step and 80–90° C. in the fourth step to produce chloral in which considerable amounts of butyl chloral, acetic acid and chlorinated acetic acid are identified as impurities.

Besides the disadvantages inherent in a series of chlorinations and the low temperature of chlorination required in the first two chlorinating steps, it will be apparent that the large amount of water present so increases the volume of materials chlorinated that the production capacity of each chlorinator is of necessity markedly decreased.

Acetaldehyde or paraldehyde has also been chlorinated in accordance with the teaching of the French Patent No. 711,095 by reaction of paraldehyde under anhydrous conditions with no more than 3 mols chlorine per mol paraldehyde to produce a product identified in the French patent as trichloroparaldehyde. The trichloroparaldehyde is capable of being depolymerized in the presence of water to yield monochloroacetaldehyde in in the presence of alcohol to yield monochloroacetal. It was found that the anhydrous hydrochloric acid used in the French patent to saturate paraldehyde and form a liquid menstruum for the anhydrous chlorination of paraldehyde caused the formation of undesirable by-products. In experimenting further with the initial reactions described in the French patent, it was found that the trichloroparaldehyde and the lower chlorinated paraldehydes produced by the anhydrous chlorination of paraldehyde in accordance with the teaching of the French patent tended to depolymerize and form monochloroacetaldehyde and acetaldehyde which reacted with chlorine to form undesirable products such as butyl chloral. This was found to have the effect of lowering the setting point of DDT prepared from the reaction product.

The disadvantages of chlorination of paraldehyde by the process of the French patent and in the manufacture of chloral from acetaldehyde by the process of United States Patent No. 2,552,934 have been overcome by the practice of this invention hereinafter specifically described by way of illustration, but not by way of limitation.

EXAMPLE 1.—ANHYDROUS CHLORINATION OF PARALDEHYDE

A dry reactor in the form of a chlorinator is first charged with about 1200 grams anhydrous chloral which functions as the liquid menstruum into which the paraldehyde and chlorine are reacted under anhydrous conditions. About 470 grams paraldehyde (equivalent to 10.7 mols of acetaldehyde) is added to the chlorinator in small increments at the rate of about 0.223 mol acetaldehyde per hour while, at the same time, charging the chlorinator with chlorine gas at the rate of about 0.424 mol per hour (equivalent to 1.9 mols $Cl_2$ per mol acetaldehyde). The reactor may be maintained at a temperature of about 35° C. by cooling with a Dry Ice-brine bath. The addition of chlorine at the rate described was continued for about one-half hour beyond that required for the addition of paraldehyde. Upon the completion of the anhydrous chlorination step, requiring about 48 hours, some of the reaction product was returned to the chlorinator for use thereafter as the anhydrous menstruum instead of chloral into which paraldehyde and chlorine were subsequently added for anhydrous chlorination. In view of the fact that it is undesirable to have substantial amounts of free acetaldehyde or paraldehyde without chlorine present in amounts to satisfy the available groups, it is desirable to balance the rate of addition of chlorine and paraldehyde to the anhydrous reactor. Sufficient chlorine should be added for reaction with the paraldehyde although an excess of chlorine can be available. The rate of addition of chlorine depends greatly upon the temperature of reaction. For example, at 35° C. described, the ratio of 1.9 mols chlorine per mol acetaldehyde is sufficient while 1.75 mols of chlorine per mol acetaldehyde are desirable for reaction at 25° C. and 2.2 mols of chlorine per mol acetaldehyde are desirable for reaction at 60° C., as indicated by the mols of chlorine reacted per mol acetaldehyde in Table I. Thus at about 60° C., it is possible to react 6.6 to 7 mols of chlorine per mol of acetaldehyde.

EXAMPLE 2.—AQUEOUS DEPOLYMERIZATION AND CHLORINATION STEP

The reaction product of the anyhdrous chlorination step of Example 1 is charged into a second chlorinator with an amount of water equivalent to 6 mols of water per mol of paraldehyde. Chlorine was added at the rate of about 0.04–0.05 mol per mol acetaldehyde per hour while gradually raising the temperature from 40° C. to reflux temperature which is found to be at about 90° C. ±10 and preferably at a temperature within the range of 40–80° C. until the amount of chlorine reacted constituted 25–50 percent by weight of the amount of chlorine being introduced. The aqueous depolymerization and chlorination step required about 40–46 hours.

Anhydrous chlorination to introduce 3 mols chlorine per mol paraldehyde in the formation of trichloroparaldehyde (1), as in the French patent, was found to be undesirable because the monochloroacetaldehyde formed thereof by depolymerization had a tendency to react with itself by aldol condensation rather than to react with chlorine to form chloral (2) and produce undesirable by-products such as butyl chloral upon subsequent chlorination.

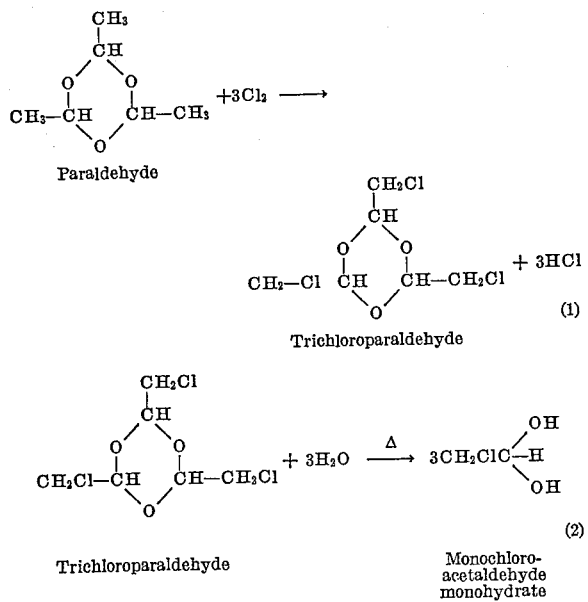

It has been found in accordance with the practice of this invention that considerably less of the undesirable by-product is formed when paraldehyde is reacted under anhydrous conditions to introduce more than three and preferably as many as six to seven mols $Cl_2$ per mol paraldehyde to produce hexachloroparaldehyde (3) which depolymerizes in the presence of water to produce dichloroacetaldehyde monohydrate.

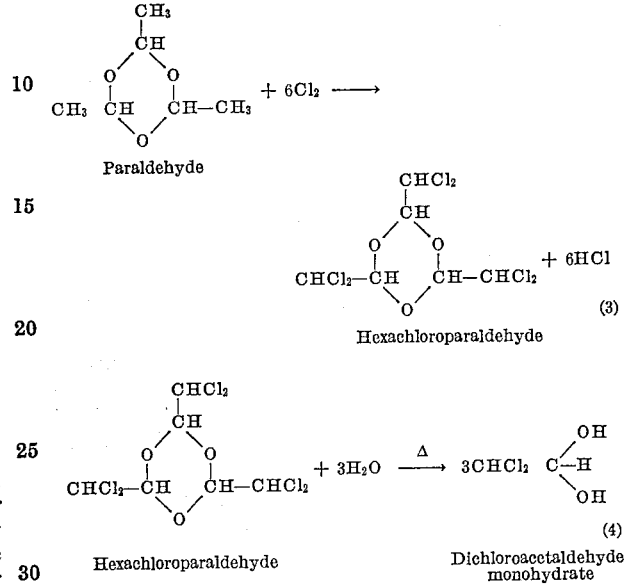

Actually addition of chlorine in theoretical amounts to produce hexachloroparaldehyde or polymerized dichloroacetaldehyde is difficult to achieve but, with proper control of conditions, as much as 1.9 mols chlorine per mol acetaldehyde or 5.7 mols chlorine per mol paraldehyde can be incorporated without difficulty at relatively low temperature to produce a reaction product containing a high yield of hexachloroparaldehyde, some pentachloroparaldehyde and tetrachloroparaldehyde, each of which is belived to constitute a new product of manufacture.

For example, it has been found that the amount of chlorine which combines with paraldehyde under the anhydrous conditions herein described depends in part upon the temperature of reaction and varies directly therewith. Within the temperature range of 25–30° C., the yield of chloral based upon the amount of paraldehyde is at a maximum and remains relatively high within the range of 15–60° C. but drops off rapidly above and below this range. The setting point of DDT also appears to drop off sharply above 60° C. Thus a chlorination temperature within the range of 25–40° C. is preferred because of the higher yield which is produced thereby as illustrated in the following Table I:

Table I.—*The effect of temperature during anhydrous chlorination*

| Temperature, °C | 15–20 | 25–30 | 35–40 | 45–50 | 55–60 | 65–70 |
|---|---|---|---|---|---|---|
| Mols $Cl_2$ Reacted/Mol Acetaldehyde | 1.54 | 1.70 | 1.84 | 2.10 | 2.12 | 2.52 |
| Percent Chloral | 67.1 | 68.6 | 67.8 | 66.1 | 63.4 | 55.0 |
| Percent Yield based upon paraldehyde | 83.8 | 87.9 | 85.9 | 81.2 | 70.4 | 57.2 |
| DDT setting point, °C.[a] | 88.9 | 88.2 | 89.1 | 89.0 | 89.2 | 87.0 |

[a] DDT prepared using a second acid wash with 100% $H_2SO_4$.

Maximum utilization of paraldehyde to increase the yield of chloral results from the introduction of chlorine slightly in excess of the amount calculated for the reaction. Such excess in amount to provide 5–10 percent by weight chlorine over and above that which combines with the paraldehyde tends to drive the reaction to the right and produce a higher yield of hexachloroparaldehyde and minimizes possible reactions of hydrochloric acid with paraldehyde to produce undesirable by-products.

An important concept of this invention resides in the anhydrous chlorination of paraldehyde with chloral or preferably in the presence of the reaction product of the anhydrous chlorination which functions as a liquid menstruum into which the paraldehyde and chlorine are added. This is to be distinguished from other liquid menstruums such as the aqueous medium of Patent No. 2,552,934 or the medium formed of paraldehyde saturated with anhydrous HCl as the starting liquid in the French Patent No. 711,095. It has been found that chloral and the reaction product of the anhydrous chlorination of paraldehyde prepared in accordance with the practice of this invention may be used as the liquid menstruum for the anhydrous chlorination step because they meet the requirements of a suitable anhydrous medium, because they will not chlorinate, and because they are incapable of reacting with paraldehyde and are therefore incapable of contaminating or causing contamination when the final product is used to form choral. It is preferred to make use of the reaction product of the anhydrous chlorination step described and claimed herein as the liquid menstruum for anhydrous chlorination but, until such reaction product is formed and can be recirculated in part back to the initial anhydrous chlorination step, the anhydrous chlorination reaction is usually initiated with anhydrous choral.

While chloral can be produced by continuous chlorination of the reaction product of the anhydrous chlorination of paraldehyde which has been depolymerized with alcohol, applicants have found that excellent yield of chloral capable of producing high setting point DDT may be produced by depolymerizing with aqueous medium to form the monohydrate with the simultaneous addition of chlorine to produce chloral. The combination of reactions carried out simultaneously will hereinafter be referred to as the aqueous chlorination step.

It has been found that the water used as the aqueous medium in the aqueous chlorination step as defined in Example 2 may be replaced, in whole or in part, by aqueous solution of mineral acids such as sulphuric acid or hydrochloric acid and that the yield of chloral will be increased when water is substituted in whole by concentrated hydrochloric acid as illustrated by the following Table II:

Table II.—A comparison of aqueous medium in the production of chloral

| Aqueous Soln. Added | Dist $H_2O$ | Tap $H_2O$ | Conc. HCl | 5% $H_2SO_4$ | 4% HCl |
|---|---|---|---|---|---|
| Chlorination Tem., °C | 40–80 | 40–80 | 40–80 | 60–80 | 60–80 |
| Comparative Yield of Chloral | 10.1 | 9.96 | 10.42 | 9.78 | 9.89 |
| Percent yield DDT | 85.5 | 84.1 | 82.2 | 83.2 | 82.1 |
| DDT setting point, °C | 87.6 | 87.4 | 87.5 | 86.6 | 86.9 |

The concentration of the aqueous medium charged to the aqueous chlorination is relatively unimportant although it appears that the chloral yield and DDT setting point may be improved by the use of larger quantities of water or other aqueous medium but the improvement is not sufficient to justify the additional use of chlorinator space required for the larger amounts of water. The ratio of water charged to chlorinated paraldehyde of similar character was varied from as little as 3 to a preferred ratio of 6–7.5 mols water per molecule of paraldehyde with very little improvement in chloral yield and DDT setting point by variation within the preferred range, as shown in the following Table III:

Table III.—The effect of ratio of water to paraldehyde during the aqueous chlorination

| | | |
|---|---|---|
| Mols $H_2O$ Added/Mol Acetaldehyde | 2.0 | 2.5 |
| Percent Yield from Paraldehyde | 89.2 | 90.8 |
| Percent Yield DDT [a] | 87.8 | 85.0 |
| DDT Setting Point, °C [a] | 90.8 | 91.2 |

[a] DDT prepared using a second acid wash with 100% $H_2SO_4$.

Aqueous chlorination apparently can be conducted through a fairly wide temperature range so long as the feed rate of chlorine is balanced in proportion to temperature to satisfy the chlorinated acetaldehyde liberated by depolymerization before it reacts with other chlorinated acetaldehyde in the presence of HCl to produce butyl chloral. Thus, although the reactivity of the chlorinated paraldehyde with chlorine is increased by the use of higher temperatures, the yield of chloral and the DDT setting point are lowered unless the rate of chlorine charged is proportionately increased. Keeping other conditions constant, increasing the reaction temperature from 40–80° C. to 60–80° C. resulted in a decrease in chloral yield from 75.3 percent to 73.7 percent, a decrease in chlorine reacted from 87.1 percent to 83.5 percent and a drop in the DDT setting point from 90.3° C. to 89.6° C. It is believed that temperatures outside the range described herein for the aqueous chlorination step may be used but that the feed rate of chlorine should be balanced therewith for most efficient practice.

It has also been found desirable to vary the rate of chlorine charged to the chlorinator in the aqueous chlorination step in accordance with the ability of the materials therein to take up chlorine in the desired manner. Either because the reaction rate of chlorine is lower at lower temperature which exists at the start of the aqueous chlorination or because the reaction product of the anhydrous chlorination is unable to take up large amounts of chlorine until depolymerized or because of a number of other reasons which might exist, it has been found that less chlorine is taken up during the initial stages of the aqueous chlorination step and therefore it is advisable to charge the chlorinator at a rate of about 0.01 to 0.03 mol $Cl_2$ per mol acetaldehyde per hour. Again near the end of the aqueous chlorination step, it is believed that less chlorine is required because of the reduction of available material to be chlorinated, most of the ingredients having been chlorinated in advance thereof so that a charge rate of $Cl_2$ corresponding to that used in the initial stages of the reaction has been found to be sufficient. In between, while depolymerization is more rapid so as to provide material capable of chlorination, the charge rate of chlorine may be increased to within the range of 0.02 to 0.05 mol $Cl_2$ per mol acetaldehyde per hour. It will be understood that the charge rate may be increased and decreased in amounts defined above depending also upon the temperature employed with a higher charge rate at higher temperature and a lower charge rate at lower temperature as previously described.

In the aqueous chlorination step it is desirable to charge the $Cl_2$ into the chlorinator in a manner capable of providing large surface area per unit weight so as to encourage solution of the chlorine gas into the materials therein. For this purpose, the chlorine gas is preferably introduced into the chlorinator through a porous plate or other member which breaks up the gas into fine bubbles substantially uniformly dispersed throughout the liquid ingredients to achieve more substantial contact therewith for reaction. These conditions for solution do not prevail in the anhydrous chlorination step because the chlorine gas is more easily and completely dissolved in the non-aqueous medium for reaction therein.

To the present the analysis of exhaust gases has been relied upon to determine the end point of the chlorination reaction in the aqueous chlorination step. The specific gravity tests which have heretofore been employed to determine the end point of chloral formation by the alcohol system have been found unsuitable because the specific gravity reaches a maximum and levels off long before the aqueous chlorination reaction has been completed. In the present system, which has been successfully employed, the amount of chlorine used is compared to the amount being added and when less than half to one-fourth of the chlorine enters into the reaction, the aqueous chlorination step is considered to be as complete as can efficiently be achieved. The analysis of exhaust gases is but one of the tests which might be used to determine the end point of the aqueous chlorination reaction. Others more adaptable to production techniques might be used in combination with the exhaustion test or separate and apart thereof.

To the present, description has been made of a new and improved process for the manufacture of chloral by the steps of anhydrous chlorination of paraldehyde with more than 3 mols chlorine to about 7 mols chlorine per mol of paraldehyde followed by aqueous depolymerization of the chlorinated paraldehyde with simultaneous continuous chlorination to form chloral. The anhydrous chlorination step with more than 3 mols and preferably about 6 mols of chlorine per mol of paraldehyde produces new compounds identified as tetrachloroparaldehyde, pentachloroparaldehyde and hexachloroparaldehyde which are capable of separation in use as a product of manufacture separate and apart from the subsequent depolymerization and chlorination in aqueous medium in the manufacture of chloral capable of use in the manufacture of a high setting point DDT with the use of less chlorine and with the use of less strategic material, such as alcohol, than has heretofore been employed in the manufacture thereof.

A further important concept of this invention resides in the separation and purification of chloral prepared by the chlorination of paraldehyde. It has been found that chloral, especially when in the presence of monochlorobenzene, may be purified, as for the preparation of high setting point DDT, by washing first with a sufficient quantity of $H_2SO_4$ of a concentration so that the $H_2SO_4$ layer after washing contains not less than about 60 percent by weight $H_2SO_4$ and preferably within the range of 70–85 percent $H_2SO_4$, especially when monochlorobenzene is present. This step removes substantially all of the water soluble impurities and practically all of the water. In the event that chlorination in the aqueous chlorination step has been carried to a substantial completion, then a second wash may be unnecessary but for most practical purposes a second wash with concentrated sulphuric acid having over 93 percent $H_2SO_4$ and preferably 100 percent sulphuric acid may be used. This removes substantially all of the remaining impurities soluble therein but not necessarily soluble in aqueous sulphuric acid. Spent oleum from DDT manufacture containing about 72 percent sulphuric acid, 25 percent chlorobenzene sulfonic acid with the remainder being non-aqueous impurities, may also be used as the second concentrated sulphuric acid wash.

In practice, it will be sufficient if the reaction product containing chloral is washed with 93 percent sulphuric acid in amounts ranging from two-thirds to two times the weight thereof in the first wash and with 100 percent sulphuric acid in amounts ranging from one-half to four times the weight thereof in the second wash. Actually the amount of sulphuric acid wash solutions used in the purification steps are not critical since the chloral readily separates therefrom so long as the concentration remains above 70 percent $H_2SO_4$ in the first wash.

Typical of the manufacture of chloral in accordance with the concepts of this invention are the conditions set forth in the following table taken from a series of production experiments, in which one-half of the anhydrous product from one cycle was used as the reaction menstruum for the anhydrous chlorination in the succeeding cycle. In the following table, the term "mols" refers to gram mols:

| Cycle | (1) | (2) | (3) | (4) | (5) |
|---|---|---|---|---|---|
| Anhydrous Chlorination Step: | | | | | |
| Anhydrous Chloral Content (Gr.) | 1214 | 607 | 304 | 152 | 76 |
| Mols AcH Added | 10.7 | 10.7 | 10.7 | 10.7 | 10.7 |
| Mols AcH in Final Soln | 10.7 | 16.05 | 18.73 | 20.07 | 20.74 |
| Mols $Cl_2$ Reacted/Mol AcH | 1.62 | 1.77 | 1.71 | 1.81 | 1.72 |
| Percent Chlorine Reacted | 84.7 | 93.0 | 89.7 | 93.5 | 94.1 |
| Aqueous Chlorination Step: | | | | | |
| Mols Chlorinated AcH Chg | 5.35 | 8.03 | 9.37 | 10.04 | 10.37 |
| Percent Chloral | 71.2 | 74.4 | 74.9 | 74.6 | 74.3 |
| Final Sp. Gr. at 20° C | 1.572 | 1.582 | 1.584 | 1.582 | 1.582 |
| Percent Chlorine reacted | 74.7 | 81.0 | 85.4 | 88.9 | 88.1 |
| Paraldehyde Efficiency | 71.2 | 86.4 | 87.3 | 88.0 | 88.6 |
| Mols $Cl_2$ Reacted/Mol Chloral Produced [a] | 1.92 | 1.53 | 1.44 | 1.42 | 1.39 |
| Mols $Cl_2$ Chg./Mol Chloral Produced [b] | 5.25 | 4.11 | 3.87 | 3.76 | 3.69 |
| Purification: | | | | | |
| Percent Yield DDT from chloral after first wash | 87.2 | 89.4 | 87.4 | 90.3 | 90.7 |
| St. Pt., °C. DDT after first wash | 88.4 | 89.7 | 90.1 | 90.0 | 89.5 |
| Percent Yield DDT from chloral with second wash | 86.2 | 84.7 | 85.3 | 87.0 | 85.7 |
| St. Pt., °C. DDT with second wash | 89.1 | 90.6 | 90.7 | 90.9 | 90.5 |

[a] Aqueous chlorination only.
[b] Total from both chlorinations.

It will be understood that changes may be made with respect to the amounts of ingredients, and time and conditions of reaction within the limitations set forth without departing from the spirit of the invention, especially as defined in the following claims.

We claim:

1. In the method of manufacturing chloral from paraldehyde by the steps of chlorinating paraldehyde in an anhydrous chlorination step for producing chlorinated paraldehyde the major portion of which is hexachloroparaldehyde, and depolymerizing the chlorinated paraldehyde in a second aqueous chlorination step to produce chloral comprising combining chlorine and paraldehyde in amounts ranging from more than 3 to less than 7 mols of chlorine per mol of paraldehyde in an anhydrous menstruum, maintaining the temperature of the reaction within the range of 15° to less than 50° C. during the anhydrous chlorination step, chlorinating the reaction product of the anhydrous chlorination step in an aqueous menstruum to depolymerize the chlorinated paraldehyde and form chloral.

2. The method of manufacturing chloral as claimed in claim 1 in which about 3 to 7.5 mols of aqueous medium are present per mol paraldehyde in the aqueous chlorination step.

3. The method of manufacturing chloral from paraldehyde as claimed in claim 1 in which the chlorine and paraldehyde are combined in amounts of more than 3 to about 6 mols of chlorine per mol of paraldehyde in an anhydrous menstruum, and maintaining the temperature of the reaction between the temperatures of 25–40° C.

4. The method of manufacturing chloral from paraldehyde as claimed in claim 1 in which the anhydrous menstruum comprises the product of the anhydrous chlorination step.

5. The method of manufacturing chloral from paraldehyde as claimed in claim 1 in which an excess of chlorine in amounts up to 10 percent by weight is introduced for the anhydrous chlorination of paraldehyde.

6. The method of manufacturing chloral from paraldehyde as claimed in claim 1 which includes the additional step of maintaining the temperature of the reaction during the aqueous chlorination step within the range of 40° C. up to reflux temperature.

7. The method of manufacturing chloral from paraldehyde as claimed in claim 1 which includes the additional step of mantaining the temperature of reaction during the aqueous chlorination step between 40° and 80° C.

8. The method of manufacturing chloral from paraldehyde as claimed in claim 1 in which the aqueous menstruum is selected from the group consisting of water and water solutions of mineral acids.

9. The method of manufacturing chloral from paraldehyde as claimed in claim 1 which includes the additional step of adding chlorine during the aqueous chlorination step at the rate of 0.02 to 0.05 mol of chlorine per mol of acetaldehyde per hour until the amount of chlorine utilized is a fraction of the amount of chlorine introduced.

10. The method of manufacturing chloral from paraldehyde as claimed in claim 1 which includes the additional step of washing the reaction product of the aqueous chlorination step with an aqueous sulfuric acid in which the amount of $H_2SO_4$ is maintained above 60 percent.

11. The method of manufacturing chloral from paraldehyde as claimed in claim 10 which includes the additional step of rinsing the product of the sulfuric acid wash with non-aqueous sulfuric acid.

References Cited in the file of this patent

UNITED STATES PATENTS

| | | |
|---|---|---|
| 768,744 | Gartner | Aug. 30, 1904 |
| 2,129,025 | Rieche | Sept. 6, 1938 |
| 2,479,559 | Dolnick | Aug. 23, 1949 |
| 2,552,934 | Cave | May 15, 1951 |
| 2,559,247 | Goebel | July 3, 1951 |
| 2,615,049 | Pianfetti et al. | Oct. 21, 1952 |
| 2,697,120 | Gilbert | Dec. 14, 1954 |

FOREIGN PATENTS

| | | |
|---|---|---|
| 661,092 | Great Britain | Nov. 14, 1951 |
| 711,095 | France | Mar. 4, 1950 |